(12) United States Patent
Ogg

(10) Patent No.: US 10,587,011 B2
(45) Date of Patent: Mar. 10, 2020

(54) NICKEL-IRON BATTERY WITH HIGH POWER

(71) Applicant: Encell Technology, Inc., Alachua, FL (US)

(72) Inventor: Randy Ogg, Newberry, FL (US)

(73) Assignee: ENCELL TECHNOLOGY, INC., Alachua, FL (US)

( * ) Notice: Subject to any disclaimer, the term of this patent is extended or adjusted under 35 U.S.C. 154(b) by 117 days.

(21) Appl. No.: 14/882,805

(22) Filed: Oct. 14, 2015

(65) Prior Publication Data

US 2016/0036095 A1 Feb. 4, 2016

Related U.S. Application Data

(63) Continuation of application No. 14/174,465, filed on Feb. 6, 2014.

(60) Provisional application No. 61/927,304, filed on Jan. 14, 2014, provisional application No. 61/761,312, filed on Feb. 6, 2013.

(51) Int. Cl.
| | |
|---|---|
| *H01M 10/26* | (2006.01) |
| *H01M 10/30* | (2006.01) |
| *H01M 4/24* | (2006.01) |
| *H01M 2/16* | (2006.01) |
| *H01M 4/32* | (2006.01) |
| *H01M 4/02* | (2006.01) |

(52) U.S. Cl.
CPC .............. *H01M 10/26* (2013.01); *H01M 4/24* (2013.01); *H01M 4/248* (2013.01); *H01M 10/30* (2013.01); *H01M 2/1653* (2013.01); *H01M 4/32* (2013.01); *H01M 2004/027* (2013.01); *H01M 2004/028* (2013.01); *H01M 2300/0014* (2013.01)

(58) Field of Classification Search
CPC ............ H01M 4/02; H01M 4/04; H01M 4/24; H01M 4/64; H01M 4/66; H01M 4/80; H01M 4/62; H01M 4/248; H01M 4/52; H01M 4/621; H01M 4/622; H01M 10/30; H01M 10/26; H01M 10/34; H01M 10/00; H01M 4/32; H01M 2/1653; H01M 2004/028; H01M 2004/027; H01M 2300/0014

See application file for complete search history.

(56) References Cited

U.S. PATENT DOCUMENTS 2,871,281 A * 1/1959 Miller ..................... H01M 4/52
  429/207
3,898,098 A 8/1975 Giles
(Continued)

OTHER PUBLICATIONS

WO 1994/20995.*
International Search Report for corresponding Application No. PCT/US2014/015049, dated May 27, 2014.

*Primary Examiner* — Ula C Ruddock
*Assistant Examiner* — Matthew W Van Oudenaren
(74) *Attorney, Agent, or Firm* — Merchant & Gould P.C.

(57) ABSTRACT

The present invention provides one with a Ni—Fe battery exhibiting enhanced power characteristics. The battery uses a particular electrolyte comprising sodium hydroxide, lithium hydroxide, and sulfide. The use of the sodium hydroxide based electrolyte with the iron anode in the battery has been found to enhance the performance characteristics of the battery. The resulting characteristics of specific power and power density are much improved over conventional Ni—Fe batteries.

11 Claims, 3 Drawing Sheets

(56) References Cited

U.S. PATENT DOCUMENTS

| | | | |
|---|---|---|---|
| 3,918,989 A * | 11/1975 | Gillman | H01M 4/02 |
| | | | 141/1.1 |
| 4,250,236 A | 2/1981 | Haschka et al. | |
| 6,171,727 B1 | 1/2001 | Ogura et al. | |
| 6,558,848 B1 | 5/2003 | Kobayashi et al. | |
| 6,844,111 B2 | 1/2005 | Mirzoev et al. | |
| 7,214,445 B2 | 5/2007 | Miyaki | |
| 7,393,476 B2 | 7/2008 | Shiozaki et al. | |
| 7,816,030 B2 * | 10/2010 | Phillips | H01M 4/244 |
| | | | 429/206 |
| 2007/0292761 A1 | 12/2007 | Park et al. | |
| 2011/0123850 A1 | 5/2011 | Duong et al. | |
| 2012/0187918 A1 | 7/2012 | Narayan et al. | |
| 2014/0220430 A1 | 8/2014 | Ogg | |
| 2014/0220431 A1 | 8/2014 | Ogg | |

\* cited by examiner

NICKEL-IRON BATTERY WITH HIGH POWER

CROSS REFERENCE TO RELATED APPLICATIONS

This application is a continuation of U.S. patent application Ser. No. 14/174,465 filed Feb. 6, 2014, which claims priority to U.S. Provisional Application Ser. No. 61/761,312, filed Feb. 6, 2013; and U.S. Provisional Application Ser. No. 61/927,304, filed Jan. 14, 2014. These applications are incorporated herein by reference in their entireties.

BACKGROUND OF THE INVENTION

Field of the Invention

The present invention is in the technical field of energy storage devices. More particularly, the present invention is in the technical field of rechargeable batteries using an iron anode and a nickel cathode.

State of the Art

Iron electrodes have been used in energy storage batteries and other devices for over one hundred years. Iron electrodes are often combined with a nickel base cathode to form a nickel-iron battery. The nickel-iron battery (Ni—Fe battery) is a rechargeable battery having a nickel (III) oxide-hydroxide cathode and an iron anode, with an electrolyte such as potassium hydroxide. The active materials are held in nickel-plated steel tubes or perforated pockets. It is a very robust battery which is tolerant of abuse, (overcharge, overdischarge, and short-circuiting) and can have a relatively long life. It is often used in backup situations where it can be continuously charged and can last for more than 20 years. Due to its low specific energy, poor charge retention, and high cost of manufacture, however, other types of rechargeable batteries have displaced the nickel-iron battery in most applications.

The ability of these batteries to survive frequent cycling is due to the low solubility of the reactants in the electrolyte. The formation of metallic iron during charge is slow because of the low solubility of the ferrous hydroxide. While the slow formation of iron crystals preserves the electrodes, it also limits the high rate performance. These cells charge slowly, and are only able to discharge slowly. Nickel-iron cells should not be charged from a constant voltage supply since they can be damaged by thermal runaway. The cell internal voltage drops as gassing begins, raising the temperature, which increases current drawn and so further increases gassing and temperature.

The industry, however, would be greatly served by a nickel-iron battery having improved performance. Such batteries, having improved specific power and power density, would be greatly welcome. The uses of nickel-iron batteries would thereby be increased.

SUMMARY OF THE INVENTION

The present invention provides one with a battery having an iron anode, e.g., a Ni—Fe battery, having improved performance characteristics. The battery uses a particular electrolyte. The resulting characteristics of specific power and power density, as well as cycle life, specific energy and charge retention, are much improved over such iron anode batteries in the prior art.

Among other factors, it has been discovered that when using an iron anode in a battery, the use of a particular electrolyte enhances the performance characteristics of the battery significantly. The electrolyte is a sodium hydroxide based electrolyte. In one embodiment, a separator is used that is a non-treated polymeric separator, e.g., made from a polyolefin. The result is a battery of enhanced power, capacity and efficiency.

DETAILED DESCRIPTION OF THE INVENTION

For the purpose of the present invention and description, the following definitions will apply.

Capacity of a battery is measured in ampere-hours (Ah).

Specific energy defines the battery capacity in weight, Watt hours/kg (WH/kg). A battery can have a high specific energy but poor specific power (load capacity), as is the case in alkaline batteries. A battery may have a low specific energy but can deliver high specific power, as is possible, e.g., with a supercapacitor. Specific energy is often thought to be synonymous with battery capacity and runtime.

Energy density, or volumetric energy density, is given in size, Watt hours/liter (WH/L).

Specific power defines the battery capacity, or the amount of current the battery can provide. Specific power is given in Watts/kg (W/kg). Batteries for power tools, for example, often exhibit high specific power but low capacity. Specific power indicates internal resistance and the delivery of power.

Power density is the amount of power per unit volume. Power density is given in Watts/liter (W/L).

C rate specifies charge and discharge currents. At 1 C, the battery charges and discharges at a current that is par with the marked Ah rating. At 0.5 C, the current is half, and at 0.1 C the current is one tenth. For example, 1 C charges a battery in about one hour; 0.5 C would take 2 hours and 0.1 C about 10 hours.

Watt hour efficiency is the energy discharged as a percentage of energy charged.

Charge retention is the capacity measured after 28 days at 20° C.

Cycle life of the battery is an important aspect, and is measured at 80% DOD (depth of discharge), at 20° C., 1 C charge, 1 C discharge, to 70% capacity.

The invention comprises a battery with an iron anode and nickel cathode. The battery, in one embodiment comprises an iron electrode comprised of a single, coated conductive substrate, prepared by a simple coating process, which can be continuous. The substrate can be coated on one side, or on both sides.

The battery is prepared by conventional processing and construction with an iron anode and a cathode, i.e., a nickel cathode. The battery of the present invention, however, comprises a particular electrolyte. In one embodiment, the nickel-iron battery also comprises a particular separator, e.g., comprised of a polyolefin. In one embodiment, the iron electrode is comprised of a single, coated conductive substrate, as shown in FIGS. 1 and 2.

Figure 1:
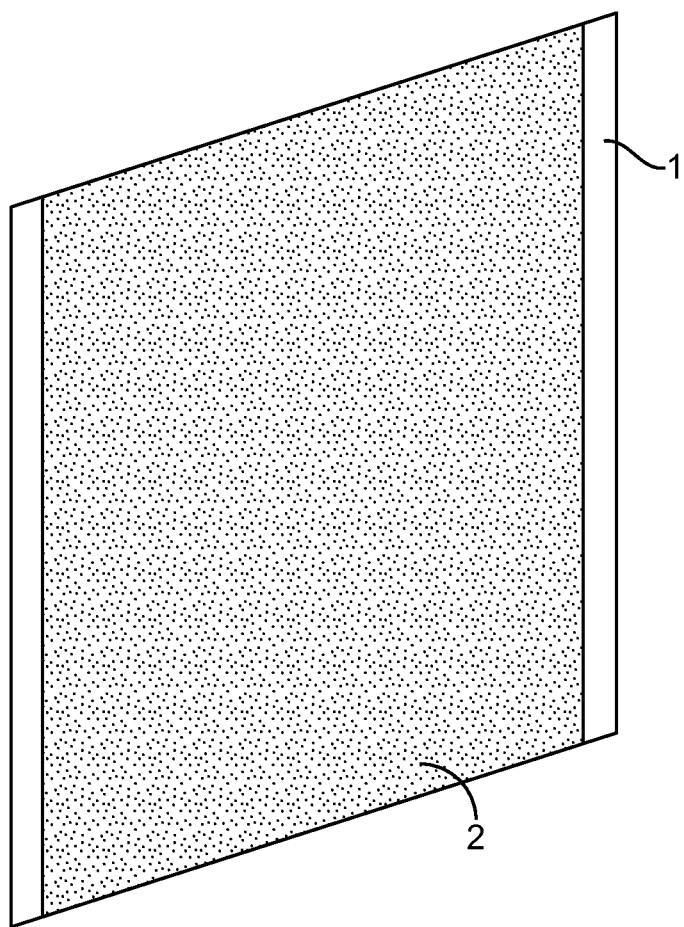
FIG. 1 is a perspective view of a coated iron anode.
Figure 2:
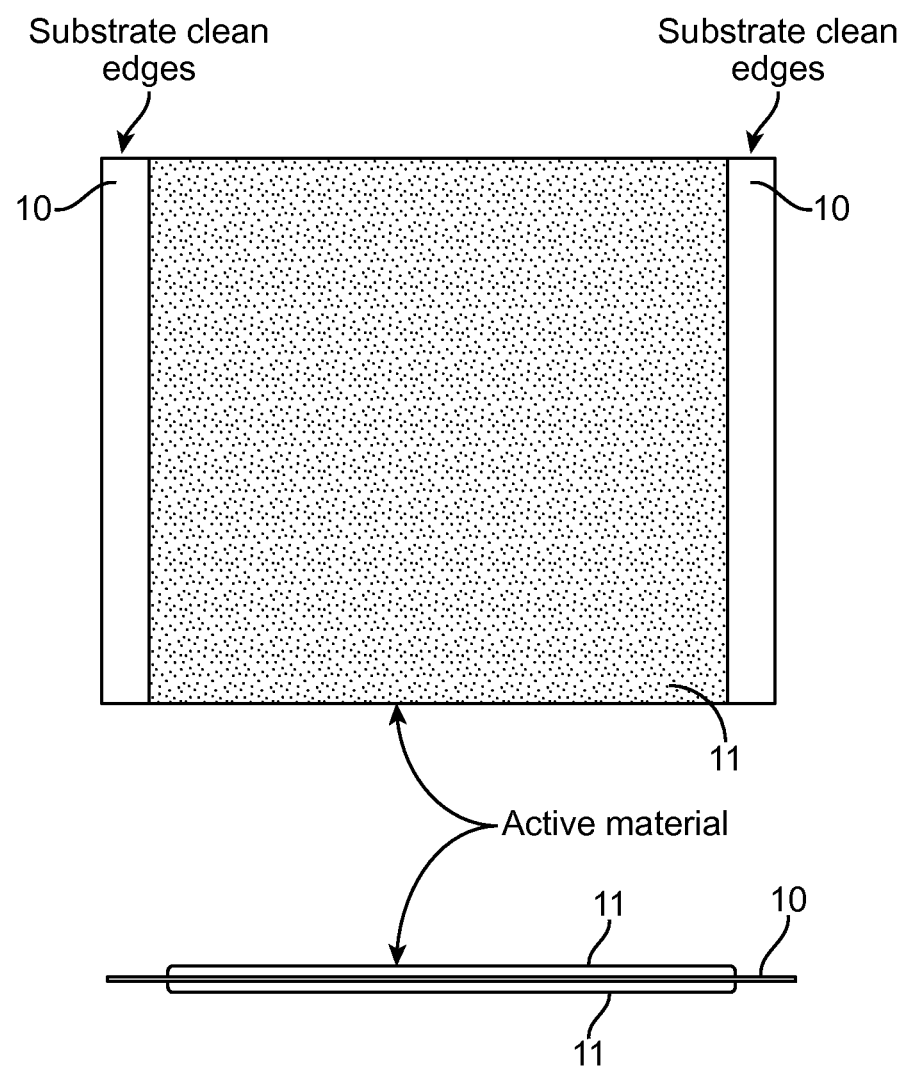
FIG. 2 is a side view and cross-section view of an iron electrode coated on both sides of the substrate.

Turning to the figures of the drawing, FIG. 1 is a prospective view of a coated iron electrode. The substrate 1 is coated on each side with the coating 2 comprising the iron active material and binder. This is further shown in FIG. 2. The substrate 10 is coated on each side with the coating 11 of the iron active material and binder.

The electrolyte used is a sodium hydroxide based electrolyte, with the sodium hydroxide generally having a concentration of 5-7N in the electrolyte. In one embodiment, the electrolyte comprises sodium hydroxide, lithium hydroxide and sodium sulfide. For example, the sodium hydroxide concentration in the electrolyte is about 6N, the lithium hydroxide concentration in the electrolyte is about 1N, and the sodium sulfide concentration in the electrolyte is about 2 wt %. In using this electrolyte with an iron anode battery, it has been discovered that the life, capacity and power of the battery is much improved. It is believed that the use of the sodium hydroxide based electrolyte reduces the iron solubility in the electrolyte, which extends the battery life. The entire cell is also more stable and effective at high temperatures. The lithium hydroxide increases charge acceptance of the positive electrode, which increases capacity.

The presence of a metal sulfide has been discovered to be important for the effective deposit of sulfur on the iron anode. A battery with an iron anode seems to work better with sodium sulfide in the electrolyte, as the sulfide ends up in the iron anode as a performance enhancer after a few cycles. The sodium sulfide in essence is believed to increase the effective surface area of the iron, so one obtains more utilization of the iron. The capacity and power is therefore improved. In addition, the added sulfide is believed to form iron sulfides, two of the forms being $FeS$ and $Fe_2S_3$, both of which are more electrically conductive than $Fe(OH)_2$ which normally forms on the iron surface. These conductive sites on the iron surface create a situation in which the oxidized layer that forms on the iron surface is thicker before true electrical passivation occurs allowing for more efficient use of the underlying iron active material. Various sulfide salts may be employed to obtain this desirable result. In one embodiment, the sulfide salt is sodium sulfide. Overall, it has been found that use of the present electrolyte improves specific power and power density of the battery. Improvements in the cycle life, the capacity (charge retention) and specific energy of a standard Ni—Fe battery are also improved.

While the use of metal sulfides such as sodium sulfide is described above, it will be understood that other sulfide compounds of suitable solubility may also be used. Examples of such sulfides include inorganic sulfides with sufficient solubility, but also organic sulfur compounds known to decompose in the electrolyte to inorganic sulfide.

It has also been found that the concentration of sulfide per se in the electrolyte can be important. In one embodiment, the amount of sulfide per se, i.e., the amount of sulfide itself, as measured as a percentage of the weight of electrolyte, is from 0.23% to 0.75%. In one embodiment, the amount of sulfide per se, measured as a percentage of the iron in the electrode, ranges from 0.23 wt % to 0.75 wt %.

The metal sulfide is preferably $Na_2S$. The sodium sulfide can be, for example, hydrated $Na_2S$. Hydrated sodium sulfide is about 60% $Na_2S$ by weight, and this must be considered in calculating the amount of sulfide per se used in the electrolyte. In general, the amount of $Na_2S$ used in the electrolyte ranges from 1-2 wt %, based on the weight of the electrolyte.

In one embodiment, the concentration of the NaOH in the electrolyte is in the range of from 6 to 7.5M. In one embodiment, the amount of LiOH in the electrolyte is in the range of from 0.5 to 2.0M, and most preferably about 1.0M. The combination of NaOH with LiOH and a sulfide is unique in its effective result.

It has also been discovered that using the electrolyte described above in combination with an iron electrode coated onto a single substrate significantly reduces the time required for activation of the cell or battery. In particular, use of this electrolyte in conjunction with an adhering type of iron electrode comprising iron active materials pasted onto a conductive substrate such as a metal foil or foam, results in a battery with improved performance over Ni—Fe batteries of conventional pocket plate design. Performance is further improved if such an adhering type of iron electrode contains sulfur or sulfide additives.

The battery separator that can be used in the present battery in combination with the electrolyte, is one that is iron-phobic. The separator can be etched for wettability, but this is merely optional when using the present battery separator. The battery separator is made of a polymer, with a generally smooth surface. The polymer can be any polymer which provides a non-polar surface, which is also generally very smooth. Examples of such polymers include polyolefins, such as polyethylene, and polytetrafluoroethylene (e.g., Teflon®). By using a separator which is more iron-phobic, the separator picks up iron at a slower rate. This results in a significant increase in the cycle life of the battery. Use of the e.g., polyolefin, separator in combination with sodium hydroxide electrolyte has been discovered to improve the performance characteristics, and most importantly the power characteristics, of a standard Ni—Fe battery.

Figure 3:
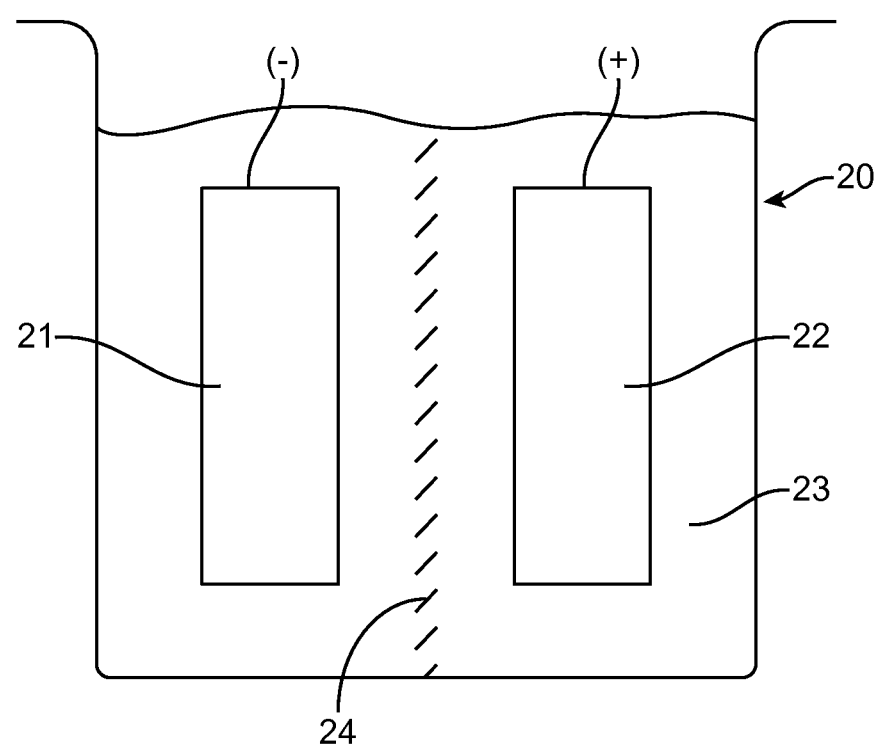
FIG. 3 is a schematic of a battery in accordance with one embodiment of the present invention.

FIG. 3 depicts a battery 20 with an iron anode 21. A nickel cathode 22 is also in the battery. The electrolyte 23 surrounds both the iron anode and cathode. The electrolyte is the sodium hydroxide based electrolyte described above, comprising sodium hydroxide, lithium hydroxide and sodium sulfide. The battery separator 24 is in one embodiment an iron-phobic battery separator having a non-polar surface. The battery separator can be made of any substance that provides such a non-polar surface. Polymers are good candidates as they provide smooth and non-polar surfaces. Suitable polymers include the polyolefins.

The battery can be made using conventional means and processes. However, the anode must be an iron anode, and an electrolyte comprising sodium hydroxide, lithium hydroxide and sodium sulfide is used. In one embodiment, both the sodium hydroxide based electrolyte and an iron-phobic battery separator are used in the battery. A great benefit of using the three component sodium hydroxide based electrolyte is that the battery can be sealed. A typical flooded design need not be used. Such a sealed battery is maintenance free as electrolyte need not be added periodically, as one would with a flooded design.

In one embodiment, the iron anode itself is different from the traditional pocket anode design. The anode is a single, coated conductive substrate, which can be coated on one side, or both sides. The anode can also be made by a simple coating process, which can be continuous.

The single substrate of the iron anode is used as a current conducting and collecting material that houses the active material (iron) of the electrode. In the traditional pocket design, the substrate encompasses the active material and holds the material. Two layers of substrate are therefore required per electrode. In the single substrate design, a single layer of substrate is used. This single layer acts as a carrier with coated material bonded to at least one side. In one embodiment, both sides of the substrate are coated. This substrate may be a thin conductive material such as a metal foil or sheet, metal foam, metal mesh, woven metal, or expanded metal. For example, a 0.060 inch, 80 ppi, nickel foam material has been used.

The coating mix for the iron anode is a combination of binder and active materials in an aqueous or organic solution. The mix can also contain other additives such as pore formers. Pore formers are often used to insure sufficient $H_2$ movement in the electrode. Without sufficient $H_2$ diffusion, the capacity of the battery will be adversely affected. The binder materials have properties that provide adhesion and bonding between the active material particles, both to themselves and to the substrate current carrier. The binder is generally resistant to degradation due to aging, temperature, and caustic environment. The binder can comprise polymers, alcohols, rubbers, and other materials, such as an advanced latex formulation that has been proven effective. A polyvinyl alcohol binder is used in one embodiment.

The active material for the mix formulation of the iron anode is selected from iron species that are generally less oxidative. Such materials include metal Fe and iron oxide materials. The iron oxide material will convert to iron metal when a charge is applied. A suitable iron oxide material includes $Fe_3O_4$. In addition, any other additives are generally required to be of a less oxidative nature, such as sulfur, antimony, selenium, and tellurium.

The coating method can be a continuous process that applies the active material mixture to the substrate by a method such as spraying, dip and wipe, extrusion, low pressure coating die, or surface transfer. A batch process can also be used, but a continuous process is advantageous regarding cost and processing. The coating mixture has to maintain a high consistency for weight and thickness and coating uniformity. This method is conducive to layering of various materials and providing layers of different properties such as porosities, densities and thicknesses. For example, the substrate can be coated with three layers. The first layer being of high density, second layer of medium density, and final layer of a lower density to create a density gradient which improves the flow of gases from the active material to the electrolyte, and provides better electrolyte contact and ionic diffusion with the active material throughout the structure of the electrode.

After coating, the electrode is dried to remove any residual liquid, i.e., aqueous or organic solvent. The drying methods will generally provide a continuous method for liquid removal from the coated active material which will enhance the adhesion and binding effects of the dry constituents without iron ignition. This drying method provides a uniform and stable active material coating with the substrate material. Two stages of drying can be used. For example, the first can be radiation for bulk drying, for cost and quality control, followed by convection drying to remove the remaining liquid. The radiation used can be any radiation, such as infrared, microwave or UV, and is very fast. However, the radiation creates a high temperature at the surface of the coated electrode. The high temperature is fine as long as water is still present to act as a heat sink. Therefore, the water is generally removed to about 10-20 wt % water. This can generally be determined using a control chart. Going below 10% water is dangerous, as the electrode becomes too dry and the high temperature can ignite the iron. Thus, using the convention drying to complete the removal of water/liquid is a preferred embodiment, once the amount of water remaining is in the 10-20 wt % range. In another embodiment, radiation can be used to complete the drying if the process is conducted in an inert atmosphere.

The compaction methods used can be accomplished by rolling mill, vertical pressing, and magnetic compaction of the active material to the desired thickness from 0.005 to 0.500 inches and porosities from 10% to 50%, for high quality and low cost continuous processing. In one embodiment, the porosity of the electrode is from 15-25% porosity. This compaction method can be used in conjunction with the layering method described above for providing material properties of density, thickness, porosity, and mechanical adhesion.

In addition, continuous in-line surface treatments can be applied continuously throughout any of the steps including coating, layering, and drying processes. The treatments can apply sulfur, polymer, metal spray, surface lament, etc.

The present batteries including the iron electrode can be used, for example, in a cellphone, thereby requiring an electrode with only a single side coated. However, both sides are preferably coated allowing the battery to be used in numerous additional applications.

The resulting battery shows improved performance characteristics, and in particular improved power characteristics, i.e., specific power and power density. Comparison to a standard Ni—Fe battery of flooded design, the present high cycle Ni—Fe battery has been found to exhibit the following characteristics:

|  | Invention | Conventional |
| --- | --- | --- |
| WH/kg (specific energy) | 105 | 50 |
| WH/L (energy density) | 183 | 40 |
| W/kg (specific power) | 2,100 | 100 |
| W/L (power density) | 3,660 | 80 |
| WH efficiency | 95% | 65% |
| Charge Retention (Capacity @ 28 days 20° C.) | 95% | 60% |
| Cycle Life (@80% DOD, 20° C., 1 C Charge, 1 C Discharge, to 70% Capacity) | 10,000 | 1,000 |

In the foregoing table, WH is Watt hours.

In the foregoing comparison, the invention Ni—Fe battery used an electrolyte comprised of sodium hydroxide (NaOH), lithium hydroxide (LiOH), and sodium sulfide ($Na_2S$). The separator used in the inventive Ni—Fe battery was a 0.010 inch thick polyolefin non-woven mesh. The electrolyte used in the conventional Ni—Fe battery was potassium hydroxide (KOH), and the battery separator was 0.060 inch thick polyvinyl chloride (PVC) windows. The results show a vast improvement in performance characteristics for the inventive Ni—Fe battery. The Ni—Fe battery, in addition to having a cycle life of at least 10,000 cycles, can also have a capacity at 28 days, 20° C., of at least 95%; a power density of at least 3,660 W/L and specific power of at least 2100 W/kg.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A battery, comprising:
   a nickel cathode;
   an iron anode comprising an iron active material that is metal iron or an iron oxide material, sulfur and a polyvinyl alcohol binder; and
   an electrolyte comprising 6 to 7.5 M sodium hydroxide, 0.5 to 2.0 M lithium hydroxide, and 1-2 wt % sodium sulfide based on the weight of the electrolyte,
   with the battery exhibiting a power density of at least about 3660 watts/liter and a specific power of at least about 2100 watts/kg.

2. The battery of claim 1, further comprising a polyolefin battery separator.

3. The battery of claim 1, which is a sealed battery.

4. The battery of claim 1, wherein the iron anode is comprised of a single layer of a conductive substrate coated on at least one side with a coating comprising the iron active material and the binder.

5. The battery of claim 4, wherein the substrate is coated on both sides.

6. The battery of claim 1, further exhibiting a specific energy of at least about 105 watt hours/kg.

7. The battery of claim 1, further exhibiting an energy density of at least about 183 watt hours/liter.

8. The battery of claim 1, further exhibiting a watt hour efficiency of at least about 95%.

9. The battery of claim 1, further exhibiting a charge retention, measured as capacity at 28 days 20° C., of at least about 95%.

10. The battery of claim 1, exhibiting
    a specific energy of at least about 105 watt hours/kg;
    an energy density of at least about 183 watt hours/liter;
    a watt hour efficiency of at least about 95%; and
    a charge retention of at least about 95%.

11. The battery of claim 1, exhibiting a cycle life of at least about 10,000 cycles.

* * * * *